May 25, 1926.
R. C. GOWDY
1,585,852
REFLECTOR FOR LIGHT PROJECTION
Filed Nov. 7, 1922   3 Sheets-Sheet 1
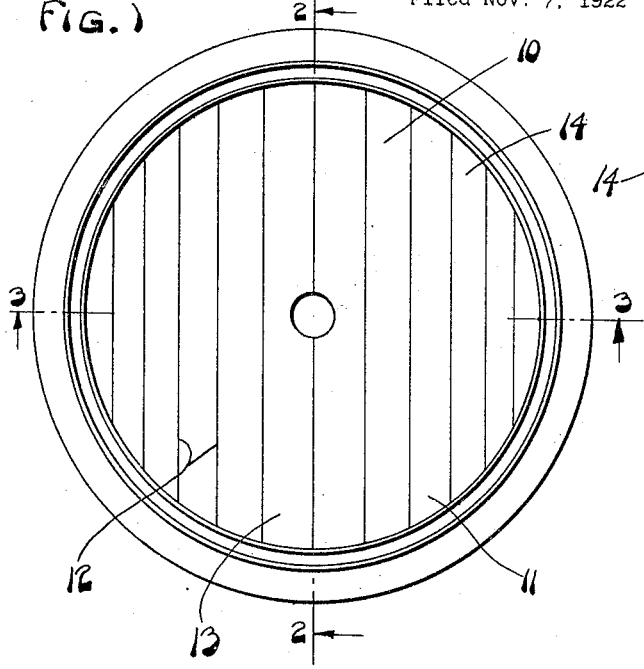
FIG.1
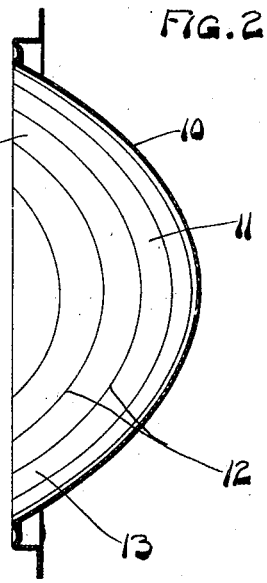
FIG.2
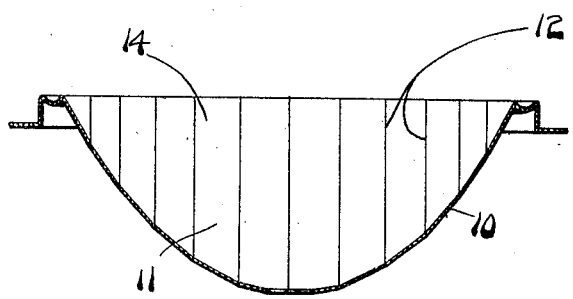
FIG.3
FIG.8
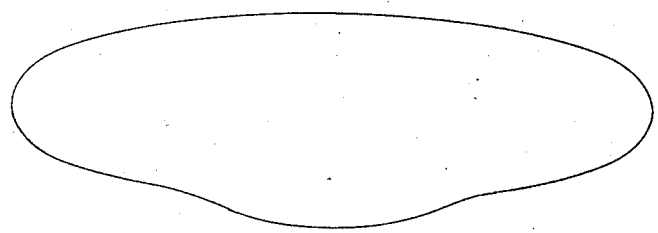
INVENTOR
R. Clyde Gowdy
BY Thornton Bogert
ATTORNEY May 25, 1926.
R. C. GOWDY
1,585,852
REFLECTOR FOR LIGHT PROJECTION
Filed Nov. 7, 1922   3 Sheets-Sheet 2
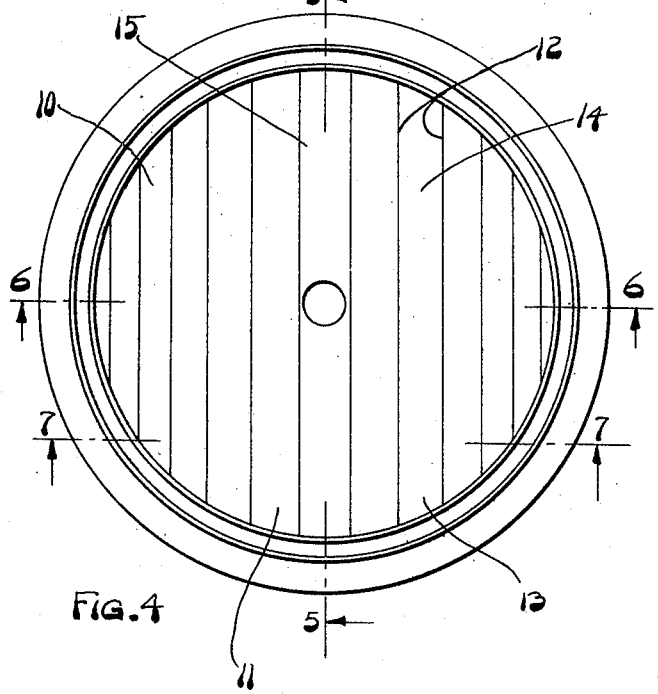
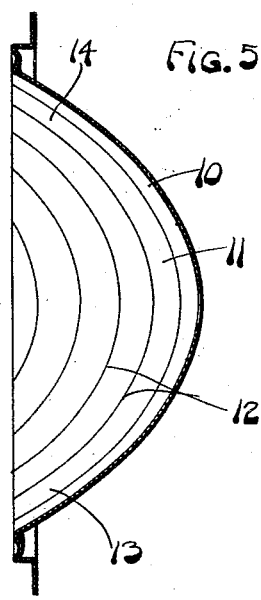
Fig.4   Fig.5
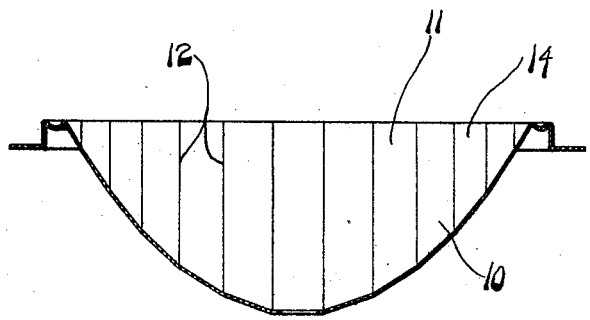
Fig.6
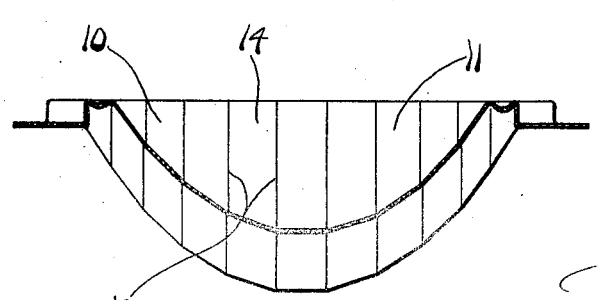
Fig.7
INVENTOR
R. Clyde Gowdy
BY Thornton Bogert
ATTORNEY

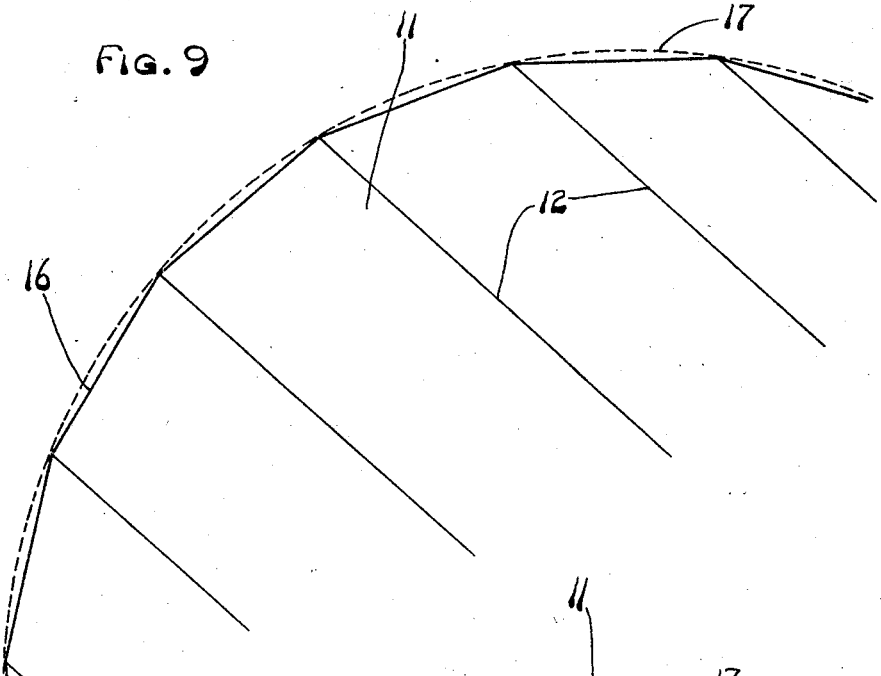
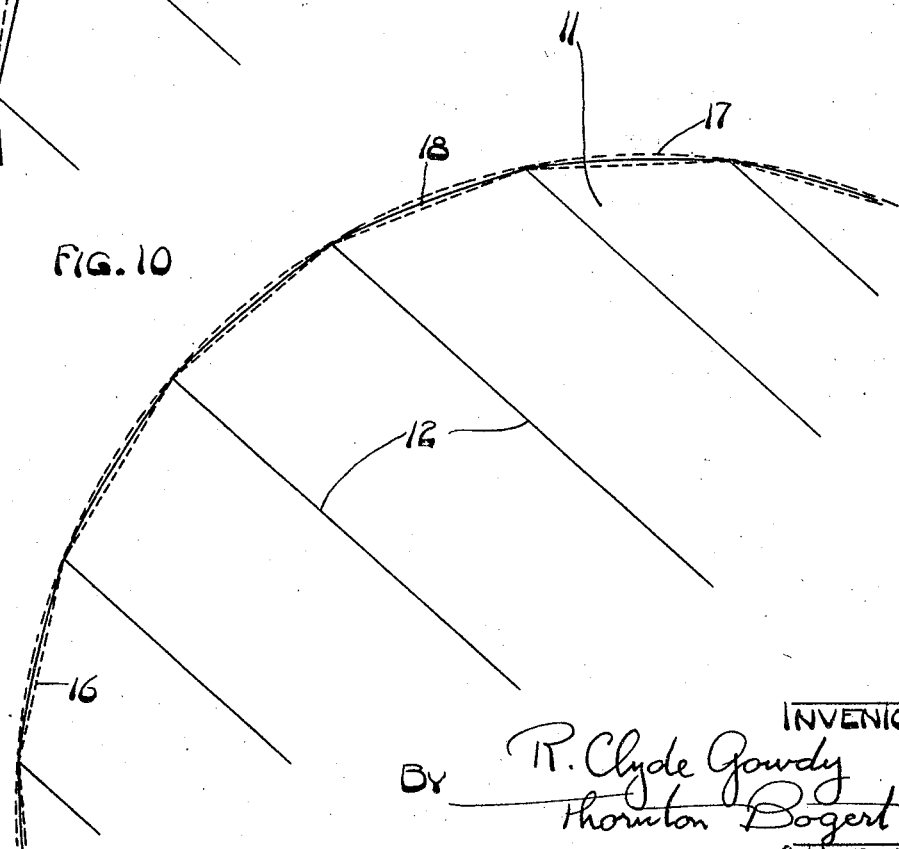

Patented May 25, 1926.

1,585,852

UNITED STATES PATENT OFFICE.

ROBERT CLYDE GOWDY, OF CINCINNATI, OHIO, ASSIGNOR, BY MESNE ASSIGNMENTS, TO THE AMERICAN FLATLITE COMPANY, OF CINCINNATI, OHIO, A CORPORATION OF OHIO.

REFLECTOR FOR LIGHT PROJECTION.

Application filed November 7, 1922. Serial No. 599,590.

The reflector described in the following specification may be used in any form of light projector, but is particualrly designed for use in the head lamps of automobiles.

Recently legislation has been enacted defining the nature and intensity of light to be projected by head lamps when fitted with a source of light of a given candle power if the use of such head lamps on public highways is to be permitted. The requirements of such legislation can most conveniently be fulfilled by a beam of elliptical or roughly diamond shaped section with high intensity in the center.

Numerous lens devices figured with flutes, facets, prisms and the like have already been used and are employed with a parabolic reflector and a source of light. The reflecting surface of reflectors has also been indented or figured with parallel grooves, furrows or the like to get the desired light pattern directly from a reflector without the use of lens and similar devices.

I differentiate my reflector from all those previously suggested or used by the following statement: My reflector comprises essentially an assemblage of stripes of the nature hereinafter specified and of a basic curvature of any conic section but of common focal point mounted together to form a bowl or cup so that the bounding edges of each stripe are contiguous with and to each other stripe.

The nature of these stripes may be ascertained from the following definition: The surface of each stripe is generated by elements which are substantially the shortest distance between the two bounding edges which are conic sections, and such elements may be straight lines or the arc of a circle of given radius. Thus the meridian plane at right angles to the planes of the bounding edges cuts all stripes in straight sections or in arcs of circles of given radius, and all other planes parallel to this meridian plane cut the stripes in curved sections.

Surfaces of the type above described have not received the attention of mathematicians to such an extent that this type of surface has been given a specific name. For lack of better name I propose to call the surfaces of both straight and curved elements conoidal surfaces, although recognizing that technically the term conoidal should be applied to surfaces having straight elements. Specifically in the case of striped spherical reflectors the stripes of straight elements are portions of truncated cones and of curved elements are tori or surfaces of revolution.

The necessity for the use of stripes of the nature above described is two fold. First, to obtain a light pattern of the required shape and distribution. Secondly, to produce a continuous reflecting surface from an assemblage of contiguous stripes.

An object of my invention has been therefore to produce a reflector of the type described, in which the objectionable features of lens are overcome and in which the requirements of the law are met fully, with such light projection as renders the reflector ideal for road illumination from the driver's standpoint as well as that of the pedestrian and the driver of an approaching vehicle.

These and other objects are attained in the reflector described in the following specification and illustrated in the accompanying drawing, in which:

Fig. 1 is a front elevational view of a reflector embodying my invention.

Fig. 2 is a vertical section of my improved reflector taken on the line 2—2 of Fig. 1.

Fig. 3 is a horizontal section taken on the line 3—3 of Fig. 1.

Fig. 4 is a front elevational view of a modified form of reflector embodying my invention.

Fig. 5 is a vertical section taken on the line 5—5 of Fig. 4.

Fig. 6 is a horizontal sectional view taken on line 6—6 of Fig. 4.

Fig. 7 is a horizontal sectional view taken on the line 7—7 of Fig. 4.

Fig. 8 is a somewhat diagrammatic view showing substantially the shape of the light beam which is projected by my improved reflector.

Figs. 9 and 10 are views upon enlarged scales, the former showing more clearly the manner of forming the flat section stripe of each zone of the form shown in Figs. 1 to 7 inclusive, the latter showing in a similar manner a still further modified form of my invention as herein described.

The reflector which I have illustrated as an embodiment of my invention has stripes which are of conic section, with the contiguous edges of such stripes coincident with a basic reflector curvature of paraboloid, hyperboloid, ellipsoid or spherical form. As a general description of my improved reflector it may be said to consist of a series of stripes having parallel sides, which are arranged parallel with one meridian of the reflector and the transverse cross section of which may be either straight or curved. This general description, which is given merely to set forth the classification under which my improved reflector is placed, will now be greatly elaborated upon in order to distinguish the present invention from those covered by patents which have been issued upon reflectors resembling mine, but from which the following description will clearly distinguish.

In my improved reflector of the exemplary forms shown, the body 10 has general hyperbolic curvature in sections taken on line 2—2 of Fig. 1, as shown in Fig. 2, or when taken on any line parallel to 2—2 and with line 5—5 of Fig. 4, as shown in Fig. 5. At right angles to these vertical sections and at any other angle thereto the reflector sections preferably are basically hyperbolic, but are modified by the presence of stripes 11. Each stripe takes in that portion of the reflector surface which lies between two planes which intersect the reflector and extend vertically and parallel with the axis of the reflector. The sections created by the intersections of these planes with the reflector are all hyperbolic in curvature, but the surfaces of the stripes are not the same as that of the basic curvature upon which the reflector is constructed. The manner of forming the stripe surfaces is as follows:

The transverse section of each stripe 11 is straight, that is, to be more specific, the section taken on any transverse line of a stripe, which is normal to the bounding curves 12 thereof, is straight. This produces a peculiarly formed surface in which the ends 13 and 14 are quite oblique with respect to its center as located on the horizontal meridian 3—3 or 6—6 of the reflector, and in which any straight sections on each side of the center of each stripe are oblique to the center section and to each other. Such stripe surfaces are not cylindrical and can not be said to be truly conoidal within the usual geometrical definition of a conoid, although so closely resembling a conoidal surface as to warrant its being designated as such within the meaning of the term as applied to the constuction described here.

The form of the invention as I have shown it in Figs. 1 to 3 inclusive, shows one embodiment in which the stripes are all conoidal or substantially so, while the form shown in Figs. 4 to 7 inclusive employs one cylindrical stripe 15 which is centrally located with respect to the conoidal stripes located on each side thereof.

One element of importance, which should be pointed out as a distinguishing feature of my invention is the manner in which the obliquely flattened surfaces of the stripes are formed with relation to the basic hyperbolic or other curve upon which the reflector is constructed. I avoid the formation of corrugations, wrinkles, folds, ridges, furrows, grooves or channels in the following manner. The basic curvature of the reflector may be a hyperbola, etc., as has been stated, and the bounding edges of each stripe are produced by the lines of intersection of the basic curvature with planes which are parallel to the axis of the reflector, as has also been explained. Therefore the sections thus produced are flattened as it were in a direction normal to the curvature of the bounding edges. In practice this result may be obtained by one or the other of two methods of construction. In one method the reflector is originally drawn to a form having the basic curvature. It is then placed on a male form which has had the stripe areas and bounding edges defined by flattening the surfaces thereof to produce the stripes of the reflector after the manner described. By means of a cooperating female form the basic curvature of the reflector is then flattened to produce the form desired. The other method which may be employed is to form the reflector of a curvature which is considerably less than the basic curvature and then stretch the metal of the reflector into the required shape by drawing it over the male form to which I have previously referred. In actual practice I have found this to be a good method to pursue in as much as there can be no buckling or wrinkling occur the resultant product being more nearly accurate than that produced by any other method I have tried. Thus it will be seen that in no way have I produced a reflector in which corrugations, cylindrical zones, and the like are used, taking the usual and commonly accepted understanding of corrugation as a basis. In Fig. 9 I have shown upon enlarged scale the manner of forming the straight cross sections 16 of the stripes 11 with relation to the marginal lines 12 and the basic curvature 17 of the reflector.

Fig. 10 discloses with sufficient clearness an additional modification of my invention, in which the principle of construction which I have employed, is put to still greater utilization. In this form I contemplate the use of any curvature as a cross sectional basis upon which to construct the stripes, which lies between the basic curvature of the reflector and the straight cross sectional stripe form 16 shown in Fig. 9 in full lines and in Fig. 10 in dotted lines. In laying out this modification, the bounding lines of the stripes are formed in the same manner as has been previously described, up to the point of laying out the stripe surfaces straight in cross section in a direction normal to the curvatures of the bounding lines thereof. Instead of then proceeding to form the stripe surface in straight cross section normal to the curvature of the bounding lines, I give the surface the desired concavity 18 to bring it within the limits of the basic curvature 17 of the reflector and the straight cross sectional form 16 of stripe. Reference to Fig. 10 will disclose that with relation to the basic curvature of the reflector, this form as well as the straight cross sectional form of reflector stripe, which I have described, avoids the formation of any angles which are reentrant upon the basic reflector curvature, thus avoiding the formation of corrugations or any groove, fold, wrinkle and the like, as well as completely avoiding the formation of cylindrical or approximately cylindrical zones or stripes, whether the reflector is provided with a central stripe after the general idea of the form shown in Figs. 4 to 7 inclusive, or whether it is provided with a series of stripes on each side of a vertical medial plane after the general manner shown in Figs. 1 to 3 inclusive.

I deem it unnecessary to enter into a lengthy explanation of the manner in which reflectors of the general type herein disclosed, operate, in view of the wide spread attention which this type of reflector has commanded, in the automobile world, as well as in scientific and other branches of the art of illumination as represented in the Patent Office and elsewhere. However the reflector disclosed in this specification embodies a number of features of novelty which are worthy of note, as compared with other reflectors in this general class. From a manufacturing standpoint, my improved reflector may be much more easily produced, with less expense as to the tools needed for its production, with less skill as to the workmanship thereon, and of cheaper material than has to be used in the making of other reflectors. The use of less skillful labor in the production of the tools and the reflectors produced therefrom, is rendered possible because of the elimination of the necessity to use extreme accuracy in producing them. I have found that slight inaccuracy in workmanship has no appreciable effect in the results obtained from the reflector and that because of the principle I employ, the material used may also be much cheaper.

Having thus described my invention what I claim is:

A reflector having a shape of basic hyperbolic curvature and composed of distinct stripes having contiguous edges and arranged relatively parallel to each other, each of said stripes having a substantially conoidal surface with the elements of each inclined relatively to each other, the ends of each of said stripes being so twisted with relation to the central portions thereof that they lie askew with relation to the ends and central portion of each of the adjacent stripes.

R. CLYDE GOWDY.